April 3, 1962 — R. W. BURBY ETAL — 3,028,514

DYNAMOELECTRIC MACHINE

Filed June 30, 1958 — 4 Sheets-Sheet 1

R.W. BURBY
F.R. MERRIAM, JR.
INVENTOR.

BY
ATTORNEYS

April 3, 1962 R. W. BURBY ETAL 3,028,514
DYNAMOELECTRIC MACHINE
Filed June 30, 1958 4 Sheets-Sheet 2
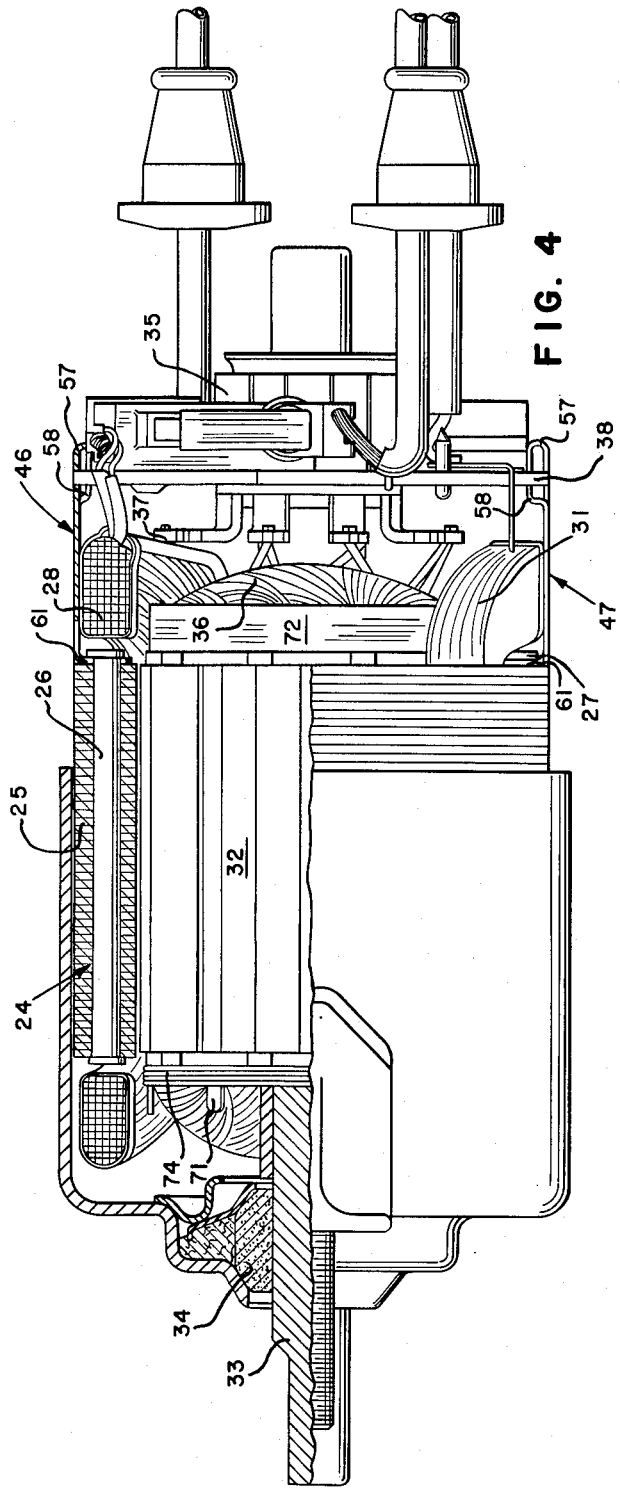
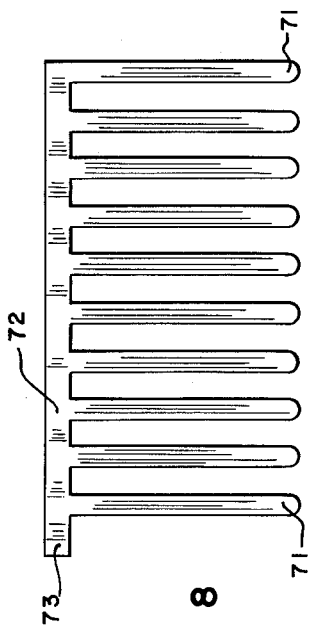
R.W. BURBY
F.R. MERRIAM, JR.
INVENTOR.
BY E.C. McRae
J.R. Faulkner
T.H. Oster
K.L. Zerschling
ATTORNEYS

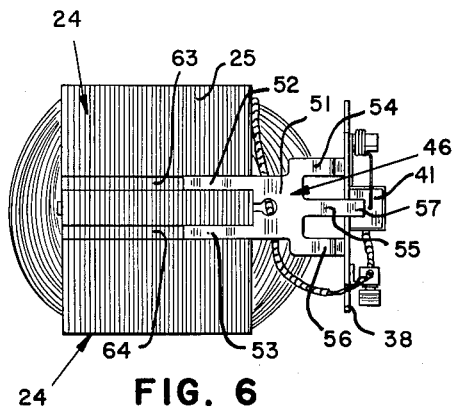
FIG. 6
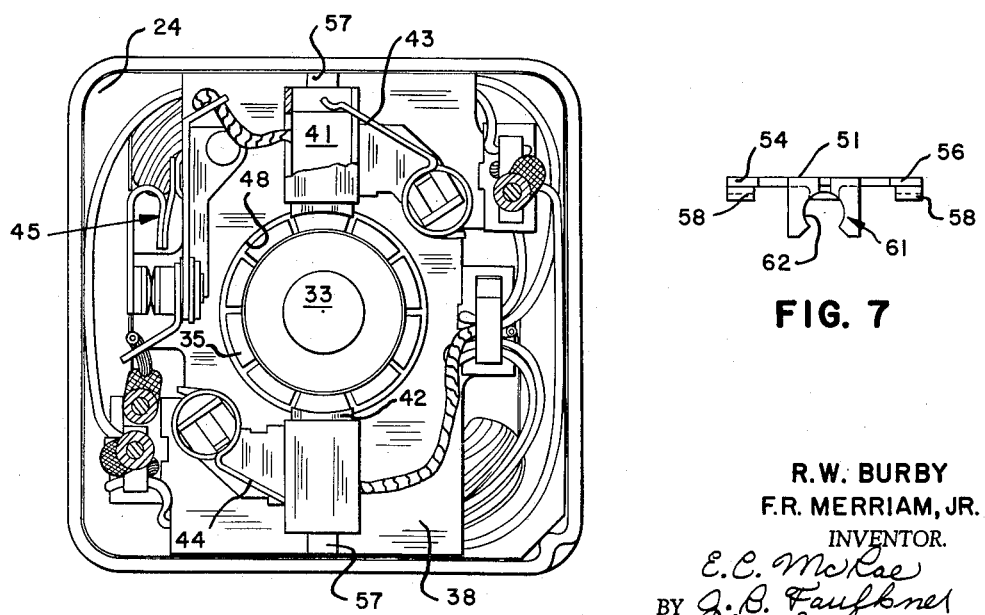
FIG. 5
FIG. 7
R.W. BURBY
F.R. MERRIAM, JR.
INVENTOR.
BY E.C. McRae
J.B. Faulkner
W.H. Oster
K.L. Gerschling
ATTORNEYS April 3, 1962 R. W. BURBY ETAL 3,028,514
DYNAMOELECTRIC MACHINE
Filed June 30, 1958 4 Sheets-Sheet 4
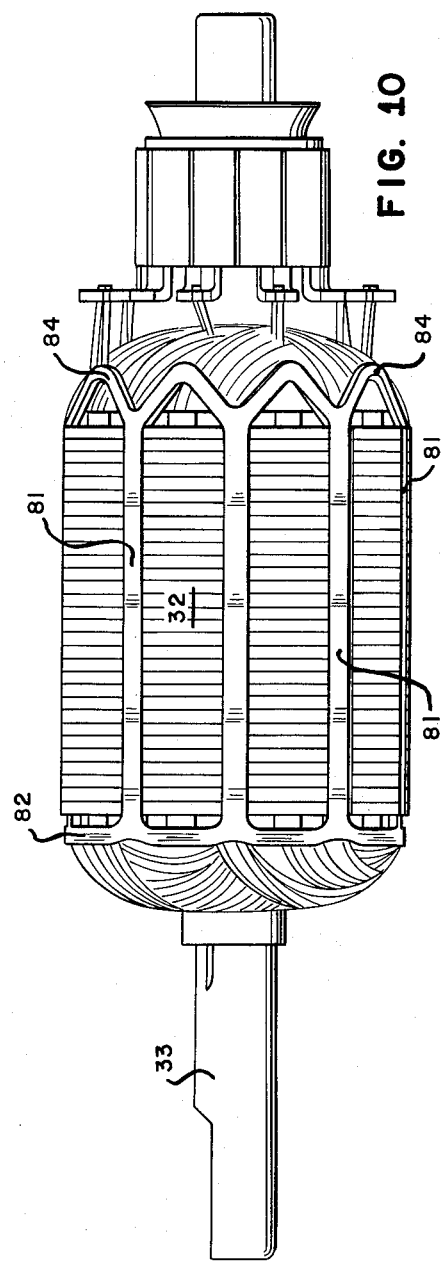
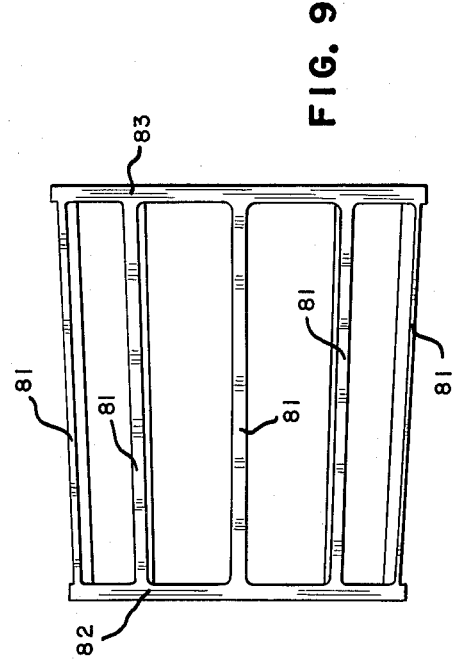
R. W. BURBY
F. R. MERRIAM, JR.
INVENTOR.
BY
ATTORNEYS

United States Patent Office 3,028,514
Patented Apr. 3, 1962

3,028,514
DYNAMOELECTRIC MACHINE
Robert W. Burby, Ypsilanti, and Frank R. Merriam, Jr., Plymouth, Mich., assignors to Ford Motor Company, Dearborn, Mich., a corporation of Delaware
Filed June 30, 1958, Ser. No. 745,634
5 Claims. (Cl. 310—177)

This invention relates to a dynamoelectric machine and more particularly to a series wound direct current motor.

Although not so limited, the present invention is particularly applicable to a series wound direct current electric motor and will be described in relation thereto. This type of motor may be employed as a driving means for a vehicle window lift actuator. Electric motors so employed must be compact and shaped to fit into the relatively small space available between the door panels. It is also necessary to obtain low zero torque speeds without affecting the torque characteristics of the machine at low speeds. The electric motor of the present invention is admirably suited to fulfill the above mentioned requirements. The motor is made square in cross section, thus gaining maximum volume and power from a motor which must fit into a space of fixed width. Two sections of the casing for the motor are fastened together by means of external bolts and the brush card holders are fixed relative to the motor frame by securing them to the laminated frame of the motor through the rivets which hold the frame laminations together.

To limit the zero torque speed of the motor, conductors—preferably copper bars, are placed in the armature slots over the armature windings and the ends of the conductors are suitably connected electrically. When the armature is rotating, currents are induced in the conductor which increase the armature losses and set up a field which opposes the field set up by the armature windings. Thus the speed of the armature is modified in such a way that the zero torque speed of the armature is considerably reduced and the torque at low speeds is relatively unaffected as the current induced in the conductors and the resultant field generated thereby is conmparatively small.

An object of the present invention is the provision of a dynamoelectric machine which is small and compact in relation to the power produced thereby.

Another object of the invention is to provide a dynamoelectric machine which is fastened together by means external to the motor frame and casing.

A further object of the invention is the provision of a dynamoelectric machine in which the brush card holder is secured to the frame through the means that holds the frame laminations together.

Still another object of the present invention is the provision of a series wound direct current electric motor which has low zero torque speed.

Other objects and attendant advantages of the present invention will become more apparent as the specification is considered in connection with the accompanying drawings in which:

FIGURE 4 is a partial longitudinal sectional view of the invention with one of the casing sections removed;

FIGURE 5 is an end elevational view of the invention with one of the casing sections removed;

FIGURE 6 is a plan view showing the frame, the brush card and the brush card holder of the present invention;

FIGURE 7 is an end view of the brush card holder employed with the present invention;

FIGURE 8 is a plan view, drawn to ½ scale of FIGURE 4, of a stamping of the conductor bars used to limit the speed of the machine shown in FIGURE 4;

FIGURE 9 is an elevational view of another conductor device used to limit the speed of the armature shown in FIGURE 10, and FIGURE 10 is an elevational view of the armature employing the speed limiting device of FIGURE 9.

Figure 1:
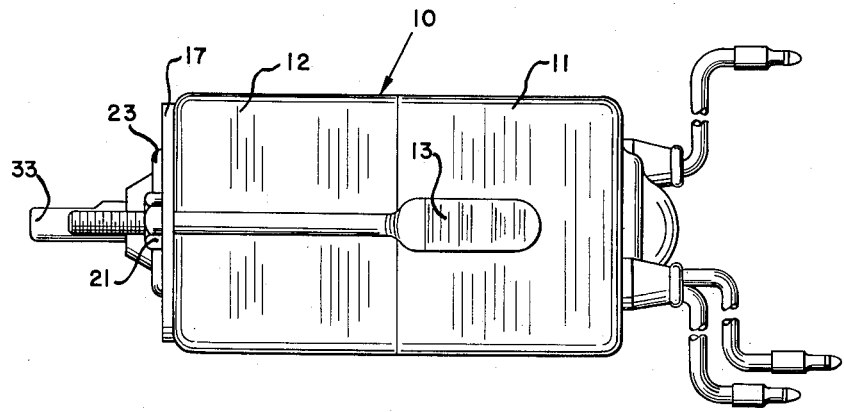
FIGURE 1 is a side elevational view of the dynamoelectric machine of the present invention.
Figure 3:
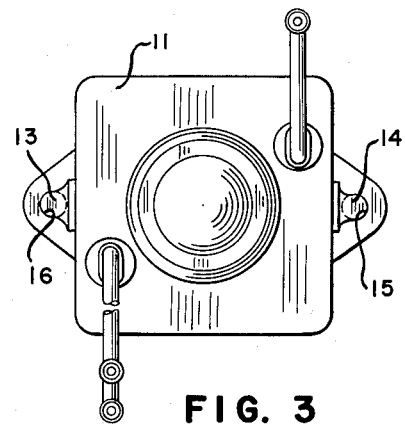
FIGURE 3 is an end elevational view of the other end of the dynamoelectric machine.
Figure 2:
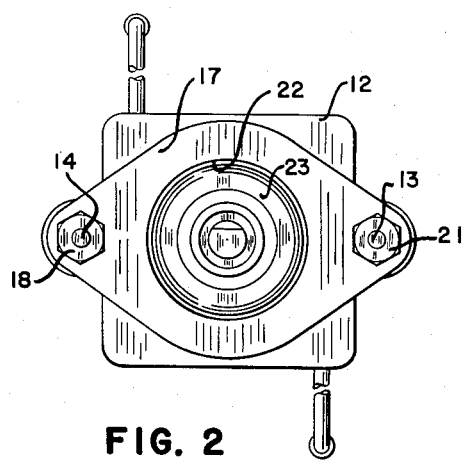
FIGURE 2 is an end elevational view of the dynamoelectric machine of the present invention.

Although by no means so limited, the present invention will be described in relation to a direct current motor. It is obvious, however, that certain features of the invention can readily be employed in any dynamoelectric machine. Referring now to the drawings in which like reference numerals designate like parts throughout the several views thereof, there is shown in FIGURES 1–3 the housing or casing structure of the motor of the present invention. The housing for the motor 10 comprises two casing sections designated by the numerals 11 and 12 which are generally rectangular or square in cross section. The casing sections enclose the frame of the motor and are secured together by means of bolts 13 and 14 which are flattened at one end and welded to opposite sides of the casing section 11 by resistance or spot welding. The other ends of the bolts 13 and 14 are threaded and pass through a pair of holes 15 and 16 in a plate 17 which fits over the end of the other casing 12. A pair of nuts 18 and 21 are threaded onto the bolts 13 and 14 to pull the two casing sections 11 and 12 together in abutting relationship. The plate 17 may conveniently have a central aperture 22 positioned therein to fit over the bearing housing 23 of casing section 12.

By reference to FIGURES 4 and 5 it can be seen that the motor frame 24 is comprised of a plurality of laminations 25 having an outer periphery of generally square configuration fastened together by means of axially extending rivets 26 and 27 and that a pair of field windings 28 and 31 are wound upon the frame to furnish the field for the motor. The armature 32 of the motor is mounted upon a shaft 33 which is supported in the frame by means of permanently lubricated sleeve bearings mounted in the casing sections 11 and 12, one of which is shown at 34. A commutator 35 is suitably mounted upon the shaft 33 and is electrically connected to armature windings 36 by means of soldered connections shown at 37.

A brush card 38 having mounted thereon a pair of brushes 41 and 42, urged against the commutator 35 by a pair of suitable springs 43 and 44, and a thermostatic circuit breaker 45, is positioned over the commutator by means of a pair of brush card holders generally designated by the numerals 46 and 47. The brush card 38 has a central aperture 48 of larger diameter than the commutator 35 to receive the commutator so that it may rotate freely with respect thereto.

The details of the brush card holders and their relation to the rest of the motor may be readily seen by reference to FIGURES 4, 6 and 7. Each brush card holder is constructed of spring steel, for example, SAE 1060 or 1065 and has a main body portion 51 with a pair of rearwardly extending tongues 52 and 53 and three forwardly extending tongues 54, 55 and 56. The middle forwardly extending tongue is provided with a hooked portion 57 while each of the outboard tongues has an inwardly extending forward extremity 58 which lies in the same plane as part of the hooked portion of the middle tongue. Extending in a plane perpendicular to the plane of the main body of the brush card holder is a bifurcated tab 61 having a central aperture 62 for receiving the rivets 26 and 27. As can best be seen by reference to FIGURES 4 and 6, the frame 24 of the motor has a pair of slots 63 and 64 for receiving the tongues 52 and 53, the bifurcated tab 61 snaps over the body of the rivets 26 and 27 between the rivet head and the frame, the middle forwardly extending tongue 55 passes over the top of the brush card with the hooked portion 57 engaging the front of the brush card 38, and the downwardly extending forward extremities 58 of each of the outboard tongues 54 and 56 engage the back of the brush card. Thus the brush card 38 is held firmly in place by the two brush card holders 46 and 47.

Referring now to FIGURE 8, there is shown a stamping of conductive material, for example, SAE 71 copper approximately 0.020 inch thick, having a plurality of bars 71 extending from a cross-bar 72. This stamping is rolled and an extended tab 73 of the cross-bar 72 is suitably welded or soldered to the other end of the cross-bar 72 to form an open ended cage. The bars 71 are then positioned in the armature slots over the armature windings and several turns of wire 74 are wound around the bars as shown in FIGURE 4 and soldered thereto to electrically connect each of the bars together, thus forming a completed cage in which all of the teeth are connected at one end by means of the cross-bar 72 and at the other end by means of the turns of wire 74.

The completed cage as shown in FIGURE 4 will substantially lower the zero torque speed of the motor by increasing the losses in the armature and by setting up a field which opposes the field of the armature windings. The torque at low speeds, however, will be relatively unaffected as the current induced in the cage will be relatively small and as zero speed is approached the torque will be unaffected as the current induced in the cage will be negligible.

Another embodiment of the cage is shown in FIGURE 9. In this embodiment, a stamping is made of conductive material, for example, SAE 71 copper .050 inch thick containing a number of spaced bars 81 and two integral end bars 82 and 83. The bars 81 are spaced closer together at the end bar 82 than they are at the other end bar 83 so that a tapered cage, as shown, is formed when the stamping is rolled and welded or otherwise suitably fastened together. The small end of the cage has a diameter smaller than the diameter of the armature core so that the bars 81 will fit into the armature slots over the armature windings and the end bar 82 at the small end of the cage will be retained by the end of the armature core. The other end of the tapered cage formed by the end bar 83 is of larger diameter than the armature core. The cage is slipped over the armature core, with the one end bar 82 abutting one end of the armature core and with the bars 81 partially fitting within the armature core slots and partially extending over said slots. A suitable tool is then used to engage the end bar 83 between each of the bars 81 and to exert a force in a direction parallel to the axis of the armature on the segments of the end bar between the bars 81 to deform the bar into axially extending loops 84 as shown in FIGURE 10. This operation reduces the effective diameter of the end 83 of the cage thus bringing the bars 81 down into the slots in the armature and over the armature windings for the full length of the slots. In operation, the cage shown in FIGURES 9 and 10 performs the same function in the same way as the cage disclosed in FIGURE 4, that is, it reduces the zero torque speed of the motor while leaving the torques at low speed comparatively unaffected.

The present invention provides an extremely compact dynamo-electric machine suitable for powering window lift actuators which has a low zero torque speed and has good torque characteristics at low speeds.

It will be understood that the invention is not to be limited to the exact construction shown and described, but that various changes and modifications may be made without departing from the spirit and scope of the invention, as defined in the appended claims.

What is claimed is:

1. A direct current series motor comprising an armature core having a plurality of slots positioned therein, armature windings positioned in said slots, a cage comprising a first annular conductor positioned around one end of said armature core, a second annular conductor positioned around the other end of said armature core and a plurality of conductive bars connecting said first and second annular conductors, said conductive bars being positioned in said armature slots over said armature windings, said motor being connectable to a direct current source for energizing said motor said cage being operative to reduce the zero torque speed of the direct current series motor.

2. A direct current series motor comprising an armature core having a plurality of slots positioned therein, armature windings positioned in said slots, a cage comprising a first annular conductor positioned around one end of said armature core, a second annular conductor positioned around the other end of said armature core and a plurality of conductive bars connecting said first and said second annular conductors, said conductive bars being positioned in said armature slots over said armature windings, said first annular conductor being formed integrally with said conductive bars and said second annular conductor comprising a plurality of turns of conductive wire affixed in conductive relationship with said conductive bars, a source of direct current electrical energy, said source being operable to energize said motor said cage being operative to reduce the zero torque speed of said direct current series motor.

3. A direct current series motor comprising an armature core having a plurality of slots positioned therein, armature windings positioned in said slots, a cage comprising a first annular conductor positioned around one end of said armature core, a second annular conductor positioned around the other end of said armature core and a plurality of conductive bars connecting said first and said second annular conductors, said conductive bars being positioned in said armature slots over said armature windings, said first and said second annular conductors being formed integrally with said conductive bars, said direct series motor being connectable to a direct current source for energizing said motor said cage being operative to reduce the zero torque speed of said direct current series motor.

4. A direct current series motor comprising an armature core having a plurality of slots positioned therein, armature windings positioned in said slots, a commutator connected to said windings, a cage comprising a first annular conductor positioned around one end of said armature core, a second annular conductor positioned around the other end of said armature core and a plurality of conductive bars connecting said first and said second annular conductors, said conductive bars being positioned in said armature slots over said armature windings, said cage being operative to reduce the zero torque speed of said direct current series motor.

5. A direct current series motor armature comprising an armature core having a plurality of slots positioned therein, armature windings positioned in said slots, a commutator connected to said windings, a cage comprising a first annular conductor positioned around one end of said armature core, a second annular conductor positioned around the other end of said armature core and a plurality of conductive bars connecting said first and said second annular conductors, said conductive bars being positioned in said armature slots over said armature windings, said cage being operative to reduce the zero torque speed of said direct current series motor.

References Cited in the file of this patent

UNITED STATES PATENTS

| | | |
|---|---|---|
| 813,472 | Willie | Feb. 27, 1906 |
| 869,602 | Varley | Oct. 29, 1907 |
| 1,539,232 | Barr | May 26, 1925 |
| 1,664,540 | Chryst | Apr. 3, 1928 |
| 2,504,564 | Merriam, Jr. | Apr. 18, 1950 |
| 2,629,061 | Swarthout | Feb. 17, 1953 |
| 2,780,741 | Lynn et al. | Feb. 5, 1957 |
| 2,780,744 | Carneck | Feb. 5, 1957 |
| 2,867,760 | Huggard | Jan. 6, 1959 |